Nov. 6, 1928.    W. L. GILCHRIST    1,690,165
AUTOMATIC HYDRAULIC VALVE
Filed Aug. 28, 1926    2 Sheets-Sheet 2

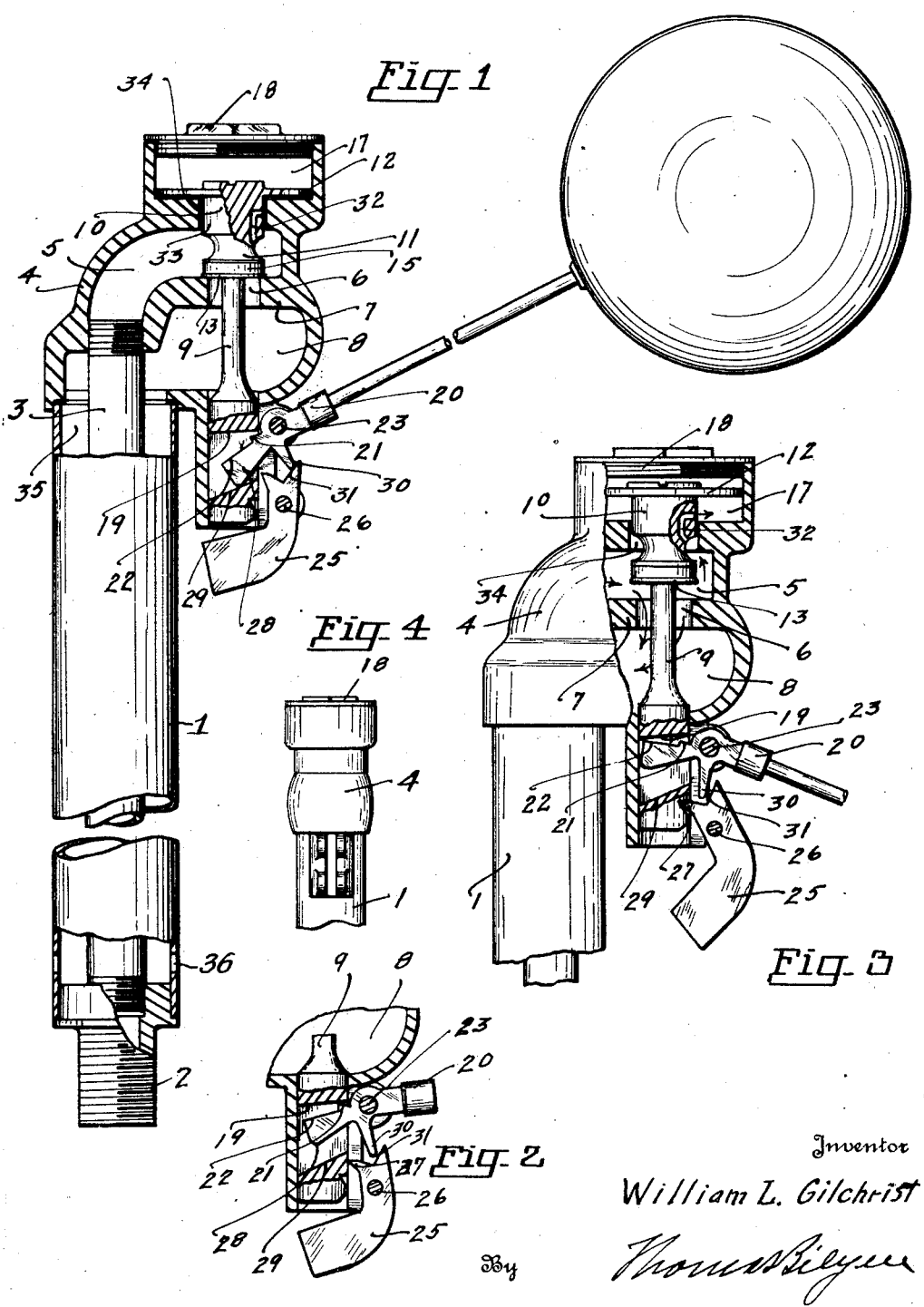

Inventor
William L. Gilchrist
By
Attorney

Patented Nov. 6, 1928.

1,690,165

UNITED STATES PATENT OFFICE.

WILLIAM L. GILCHRIST, OF ALBANY, OREGON, ASSIGNOR TO STANDARD SECURITIES CO., A CORPORATION OF OREGON.

AUTOMATIC HYDRAULIC VALVE.

Application filed August 28, 1926. Serial No. 132,222.

My present invention relates to hydraulic valves having a primary object similar to that of my pending application for United States patent as evidenced by application filed June 2, 1925, Serial No. 34,398, for an automatic hydraulic ball cock.

A further object of my present invention consists in providing an automatic valve that is noiseless in operation irrespective of the pressure in the supply line for the liquid to be passed therethrough.

A still further object of my present invention consists in providing a valve that is adapted for use in toilet flushing tanks, and other places of similar and kindred nature, wherein automatic means are required for the control of the liquid entering the flushing tank.

A still further object of my invention consists in providing a valve having simple and easy means for the removal of the valve for adjustment and repair without the necessity of removing the entire valve structure from its place and position of use.

A still further object of my invention consists in providing an automatic cushioning escapement within the valve chamber.

Additional objects of my invention consist in providing simple means for the cracking of the valve from its seat.

With these and incidental objects in view, the invention consists in certain novel features of construction and combination, the essential elements of which are set forth in the appended claims, and a preferred form of embodiment is hereinafter shown with reference to the drawings which accompany, and form a part of this specification.

In the drawings:—

Fig. 1 is a side elevation, partially in section, of one of my new and improved automatic hydraulic valves being actuated by a float ball and arm.

Fig. 2 is a fragmentary, side elevation, partially in section, of the actuating mechanisms for raising and lowering the valve, with the actuating mechanism, in its initial operating position, for the raising of the valve.

Fig. 3 is a side elevation, partially in section, illustrating the valve completely raised to permit the flow of liquids therethrough.

Fig. 4 is a front elevation of a preferred form of embodiment of the valve casing.

Like reference characters refer to like parts throughout the several views.

Figure 7:
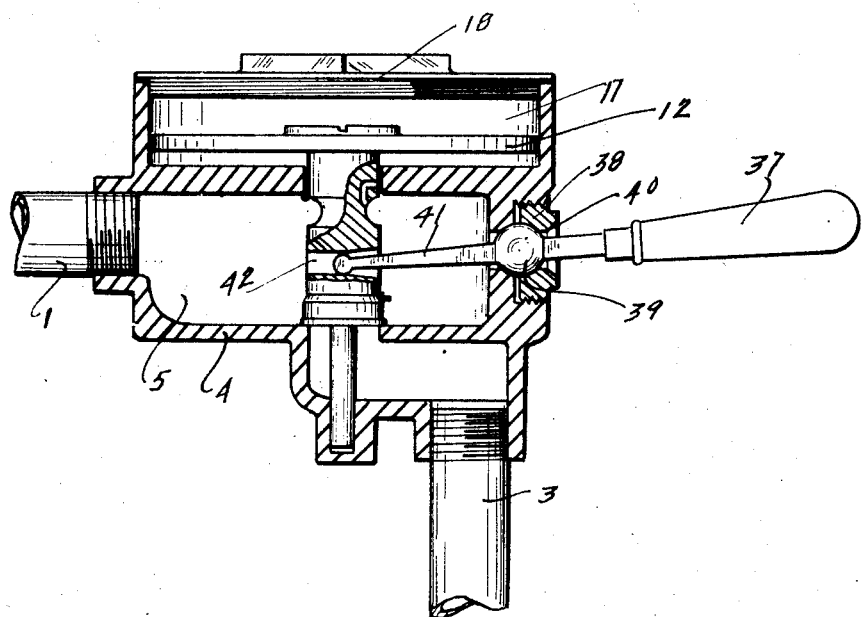
Fig. 7 is a side elevation, partially in section, of another embodiment of one of my new and improved automatic hydraulic valves adapted to hand manipulation.
Figure 5:
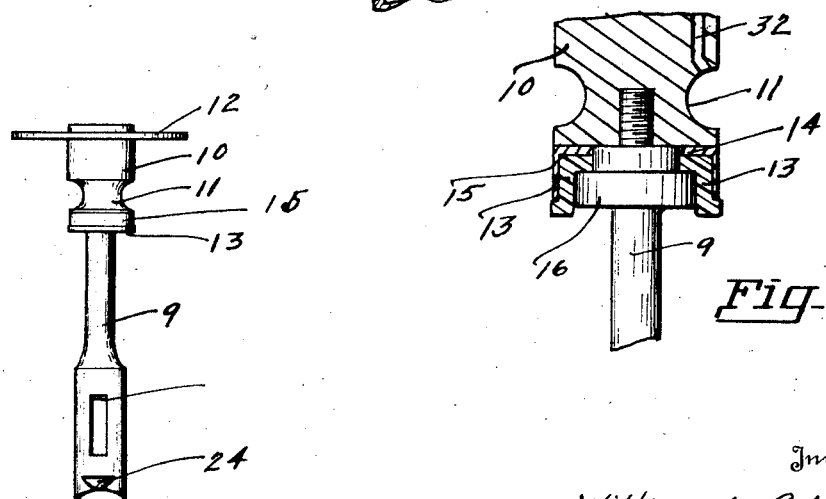
Fig. 5 is a front elevation of the complete assembly of the preferred embodiment of the valve head.
Figure 6:
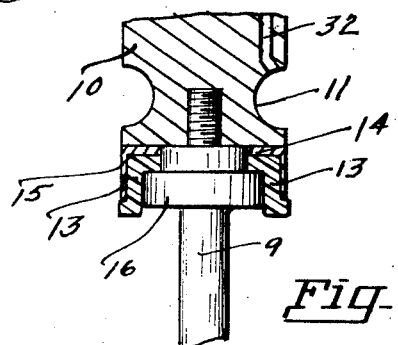
Fig. 6 is a fragmentary cross-section view of the gasket for one of my new and improved valves.

1 is the tubular or cylindrical member of the valve, terminating on its lower end 2, for a threaded engagement with the supply line for supplying the materials to be passed through the valve. Disposed centrally of the cylindrical member 1 is an inlet pipe 3, adapted to the primary passage of the liquid from the source of supply (not here shown) and conducting the same to the valve casing 4. The valve casing 4 has a passageway or chamber 5 connecting with the supply line and has an opening 6, passing through the valve seat 7 into the outlet chamber 8. Within the valve casing is a valve stem 9, having a head 10 secured upon the upper end thereof, the valve stem 9 and the head being secured together by any suitable fastening means, as by being screwed together. A channel 11 is formed circumferentially of the head which also has a disc 12 secured to the upper end thereof; a gasket 13 is disposed on the lower side of the head 10, and is maintained in position by the head 14, having an annular side wall member 15 adapted for engagement with the side walls of the gasket 13, on its outer periphery. The collar 16, disposed upon the valve stem 9, engages the under side of the gasket 13, a tight relationship being maintained between the valve head, the gasket 13, and between the head and the stem by the threaded relationship between the valve stem and the valve head. A chamber 17 is formed in the upper end of the valve casing, and to permit of the removal of the head 10 from the valve stem 9, a plug 18, is provided which is threaded to the casing. The limit of tolerance between the outer periphery of disc 12 and the inner surface of the chamber 17 is sufficient only for the free movement of the disc longitudinally of the space formed at 17. When the head 10 is raised the passage of liquid is permitted through the opening 6. The initial cracking of the valve, especially where high operating pressures are maintained is quite essential. To provide for an easy opening of the valve I have provided a cammed surface 19 within the stem 9, and the actuating lever 20 has two cammed surfaces 21 and 22 formed upon the upper side thereof and is pivoted about the journal support 23. The primary engaging surface 21 being close to the pivotal center 23 of the operating lever greatly increases the mechanical advantage for the cracking of the valve from its seat. A further movement of the lever 20 engages the surface 22 with a camming surface 19 and rapidly raises the valve to its maximum opening, in which position it is locked by the locking point 27, of the pawl 25, journaled about the supporting pin 26 engaging in the notch 24 of the valve stem. The raising of the operating lever 20 to maximum height, as illustrated in Fig 1, causes the lower camming surface 28 of the lever 20 to engage the camming surface 29, thus lowering the valve to closed position. The locking lever 25 is disengaged by the finger 30 on the lever 20 engaging with the projection 31 of the locking lever 25.

To prevent a water hammer being formed, by the closing of the valve, the liquid passes through the by-pass 32 into the chamber 17 and the liquid trapped within the chamber 17 must escape through the tolerances provided between the peripheral surface 33 of the valve head and the wall of the opening 34 through the valve casing. This permits positive opening and closing of the valve wherein a period of time sufficient to permit the escape of the liquid trapped within the chamber 17 must elapse, thus providing a valve for the purpose intended that is absolutely noiseless in its operation.

The liquid passing through the valve passes through outlet chamber 8 into the passageway 35, disposed between the inner wall of 1 and the outer wall 3, and passes to the point of use through openings 36.

Where it is desired to use one of my new and improved devices on faucets and the like a lever 37 is journaled within a suitable bearing 38 as by the use of a ball 39, disposed upon the lever and engaging the bearing 38, and having an arm 41 passing through the body portion of the valve casing and engaging the upper and lower surfaces of the slot 42, of the main body portion of the valve head.

The detail of construction herein referred to is illustrated in detail in Fig. 7, otherwise the operation of the valve is the same as heretofore described. A measured amount of liquid will be supplied where the valve is raised, the amount of liquid flowing depending upon the time required for the escapement of the liquid trapped within the chamber 17.

While the form of mechanism herein shown and described is admirably adapted to accomplish the objects primarily stated, it is not intended to confine the invention to the specific form herein described, as it is susceptible of embodiment in various limited ways all coming within the scope of the claims which follow.

What I claim is:—

1. In a device of the class described, a pair of concentric tubular members, a valve casing mounted on said tubular members, an inlet chamber and an outlet chamber formed in the casing and communicating respectively with the inner and outer tubular members, a passageway between the two chambers, the portion of the casing surrounding the upper end of said passageway forming a valve seat; a valve, above said passageway adapted to engage said seat; said valve having a stem provided with a longitudinally disposed slot; a lever fulcrumed to said casing, engageable with the upper and lower walls of said slot for the purpose of raising and lowering said stem; a pawl rockably carried by said casing; said pawl adapted to engage said stem when in a raised position; and a finger carried by said lever adapted to engage said pawl to release said stem therefrom when the lever is moved to a position for lowering the valve.

2. In a device of the class described, a valve casing, an inlet chamber and an outlet chamber formed therein, a passageway leading from the inlet chamber to the outlet chamber, the portion of the casing surrounding the upper end of said passageway forming a valve seat; a valve head, above said passageway adapted to engage said seat; a stem for said valve; a third chamber formed in said casing; a disc mounted on said valve head to form a plunger vertically shiftable in said last mentioned chamber; means permitting retarded ingress and egress of a fluid between the inlet chamber and the last mentioned chamber; a fulcrumed lever adapted to raise and lower said valve head and stem; a pawl rockably carried by said casing adapted to support said stem in raised position when the lever is in its lower position for raising the valve head; and a finger on said lever adapted to release said pawl when said lever is raised for lowering the valve head.

3. In a device of the class described, a valve casing, an inlet chamber and an outlet chamber formed therein, a passageway leading from the inlet chamber to the outlet chamber, the portion of the casing surrounding the upper end of said passageway forming a valve seat; a valve head above said passageway adapted to engage said seat; a stem for said valve, a cylindrical chamber formed in said casing; a disc mounted on said valve head and vertically movable within said cylindrical chamber; a bypass formed through said valve head to afford communication between the inlet chamber and the cylindrical chamber when said head is in other than a lowered position; a fulcrumed lever adapted to raise and lower said valve head and stem; means adapted to support the valve head and stem in an elevated position when the lever is in its lower position for raising the valve head; and means adapted to disengage said last mentioned means from said stem to permit said valve head and stem to be moved to a lowered position when said lever is raised for lowering said stem.

4. In a device of the class described, a valve casing, an inlet chamber and an outlet chamber formed therein, a passageway leading from the inlet chamber to the outlet chamber, the portion of the casing surrounding the upper end of said passageway forming a valve seat; a valve head above said passageway adapted to engage said seat; a stem for said valve, a cylindrical chamber formed in said casing; a disc mounted on said valve head and vertically movable within said cylindrical chamber; a bypass formed through said valve head to afford communication between the inlet chamber and the cylindrical chamber when said head is in other than a lowered position; said stem being provided with a longitudinally disposed slot; a lever fulcrumed to said casing, engageable with the upper and lower walls of said slot for the purpose of raising and lowering said stem; a pawl rockably mounted on said casing; said pawl adapted to engage said stem when in a raised position; and a finger carried by said lever adapted to disengage said pawl from said stem when the lever is moved to a position for lowering the valve.

WILLIAM L. GILCHRIST.